(12) United States Patent
Sabin et al.

(10) Patent No.: US 12,593,203 B2
(45) Date of Patent: Mar. 31, 2026

(54) REMOTE IDENTITY VERIFICATION AND DYNAMIC STORAGE OF IDENTITY DATA

(71) Applicant: DigiCert, Inc., Lehi, UT (US)

(72) Inventors: Jason Allen Sabin, Lehi, UT (US); Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 308 days.

(21) Appl. No.: 18/296,547

(22) Filed: Apr. 6, 2023

(65) Prior Publication Data

US 2024/0340637 A1 Oct. 10, 2024

(51) Int. Cl.
| | |
|---|---|
| *H04K 1/00* | (2006.01) |
| *H04W 8/22* | (2009.01) |
| *H04W 12/02* | (2009.01) |
| *H04W 12/69* | (2021.01) |

(52) U.S. Cl.
CPC ............. *H04W 12/02* (2013.01); *H04W 8/22* (2013.01); *H04W 12/69* (2021.01)

(58) Field of Classification Search
CPC .............................. H04W 12/02; H04W 12/69
USPC ......................................................... 380/270
See application file for complete search history.

(56) References Cited

U.S. PATENT DOCUMENTS

| | | | |
|---|---|---|---|
| 7,734,962 B2 | 6/2010 | Sabin et al. | |
| 8,107,736 B2 | 1/2012 | Brown et al. | |
| 8,443,416 B2 | 5/2013 | Sabin et al. | |
| 8,468,455 B2 | 6/2013 | Jorgensen et al. | |
| 8,522,247 B2 | 8/2013 | Brown et al. | |
| 8,561,137 B2 | 10/2013 | Sabin et al. | |
| 8,595,647 B2 | 11/2013 | Sabin et al. | |
| 8,639,926 B2 | 1/2014 | Brown et al. | |
| 8,806,014 B2 | 8/2014 | Carter et al. | |
| 8,943,320 B2 | 1/2015 | Sabin et al. | |
| 8,948,399 B2 | 2/2015 | Sabin et al. | |
| 8,949,832 B2 | 2/2015 | Brown et al. | |
| 9,088,480 B2 | 7/2015 | Burch et al. | |
| 9,208,350 B2 | 12/2015 | Sabin et al. | |
| 9,317,407 B2 | 4/2016 | Sabin et al. | |
| 9,350,536 B2 | 5/2016 | Sabin | |
| 9,454,406 B2 | 9/2016 | Sabin et al. | |
| 9,479,338 B2 | 10/2016 | Sabin | |
| 9,519,777 B2 | 12/2016 | Brown et al. | |
| 10,057,113 B2 | 8/2018 | Sabin et al. | |
| 10,114,678 B2 | 10/2018 | Sabin et al. | |

(Continued)

FOREIGN PATENT DOCUMENTS

| | | |
|---|---|---|
| EP | 2045997 B1 | 1/2012 |

*Primary Examiner* — Jeffrey C Pwu
*Assistant Examiner* — Samuel Ambaye
(74) *Attorney, Agent, or Firm* — Baratta Law PLLC; Lawrence A. Baratta, Jr.

(57) ABSTRACT

Systems and methods are provided to offer security or trust services to entities over a network. A method, according to one implementation, includes the step of receiving, from a representative of an enterprise, a selection of a group of users to be assigned one or more authorities within the enterprise. The method also includes the step of remotely accessing one or more identity information repositories associated with the enterprise to obtain records pertaining to each user of the group. Also, the method includes the step of using the records to onboard the group of users, whereby onboarding the group includes assigning the one or more authorities to each user of the group.

18 Claims, 4 Drawing Sheets

(56)         References Cited

U.S. PATENT DOCUMENTS

| 10,148,657 | B2 | 12/2018 | Brown et al. |
| 10,341,383 | B2 | 7/2019 | Sabin et al. |
| 10,360,054 | B2 | 7/2019 | Kranendonk et al. |
| 10,503,914 | B2 | 12/2019 | Sabin et al. |
| 10,958,437 | B2 | 3/2021 | Sabin |
| 11,170,316 | B2 | 11/2021 | Brown et al. |
| 2009/0300495 | A1 | 12/2009 | Brown et al. |
| 2010/0131641 | A1 | 5/2010 | Brown et al. |
| 2010/0251141 | A1 | 9/2010 | Sabin et al. |
| 2011/0029500 | A1 | 2/2011 | Brown et al. |
| 2012/0066487 | A1 | 3/2012 | Brown et al. |
| 2012/0084844 | A1 | 4/2012 | Brown et al. |
| 2013/0326063 | A1 | 12/2013 | Burch et al. |
| 2014/0019762 | A1 | 1/2014 | Sabin |
| 2014/0052849 | A1 | 2/2014 | Sabin |
| 2014/0237091 | A1 | 8/2014 | Sabin et al. |
| 2014/0344937 | A1 | 11/2014 | Sabin et al. |
| 2014/0359016 | A1 | 12/2014 | Sabin et al. |
| 2015/0143458 | A1 | 5/2015 | Brown et al. |
| 2016/0173611 | A1 | 6/2016 | Sabin et al. |
| 2016/0365985 | A1 | 12/2016 | Pilcher et al. |
| 2019/0026458 | A1 | 1/2019 | Choules et al. |
| 2019/0149579 | A1* | 5/2019 | Kakumani .......... H04L 63/0876 726/1 |
| 2021/0051159 | A1* | 2/2021 | Kesanupalli .......... H04L 63/102 |
| 2022/0050890 | A1* | 2/2022 | Karantzis .............. G06F 21/305 |
| 2022/0092168 | A1 | 3/2022 | Brown et al. |
| 2022/0368525 | A1* | 11/2022 | Robinson-Morgan .... H04L 9/14 |
| 2023/0106024 | A1* | 4/2023 | Keith, Jr. ............... G16H 40/63 726/5 |

* cited by examiner

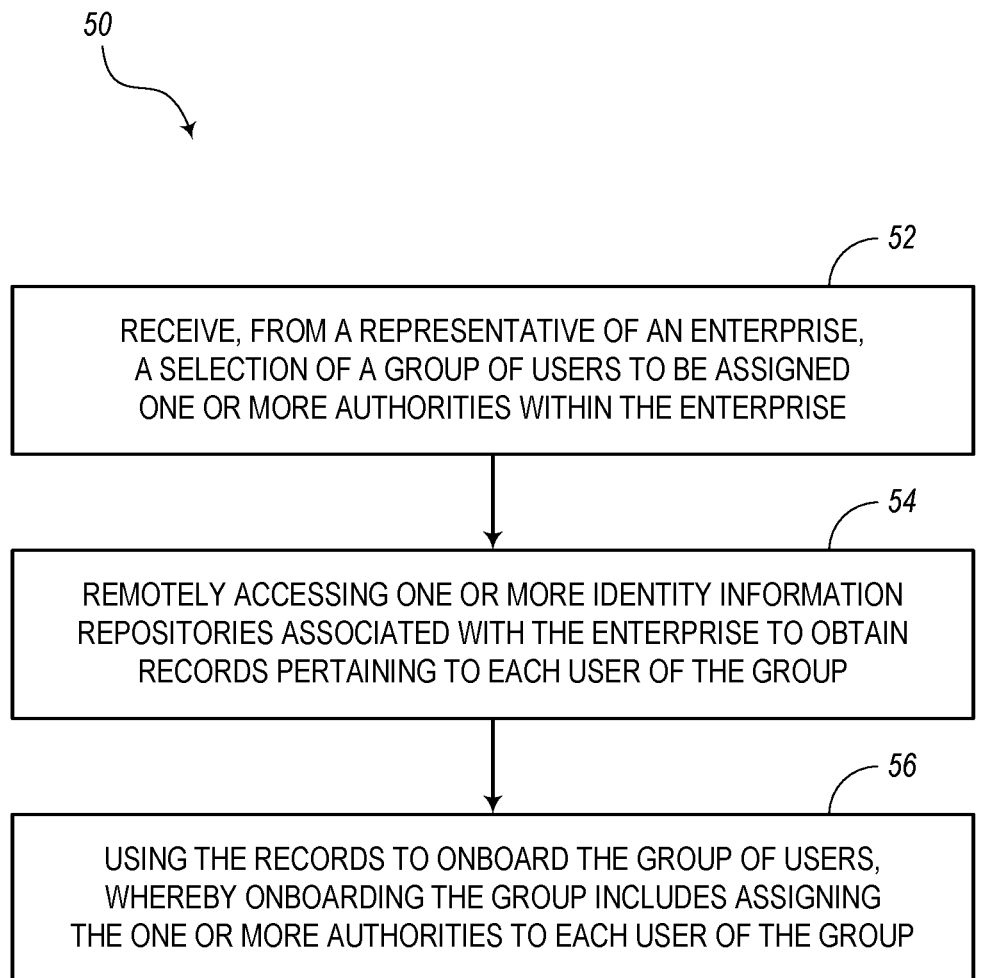

*50*

*52*

RECEIVE, FROM A REPRESENTATIVE OF AN ENTERPRISE, A SELECTION OF A GROUP OF USERS TO BE ASSIGNED ONE OR MORE AUTHORITIES WITHIN THE ENTERPRISE

*54*

REMOTELY ACCESSING ONE OR MORE IDENTITY INFORMATION REPOSITORIES ASSOCIATED WITH THE ENTERPRISE TO OBTAIN RECORDS PERTAINING TO EACH USER OF THE GROUP

*56*

USING THE RECORDS TO ONBOARD THE GROUP OF USERS, WHEREBY ONBOARDING THE GROUP INCLUDES ASSIGNING THE ONE OR MORE AUTHORITIES TO EACH USER OF THE GROUP

FIG. 3

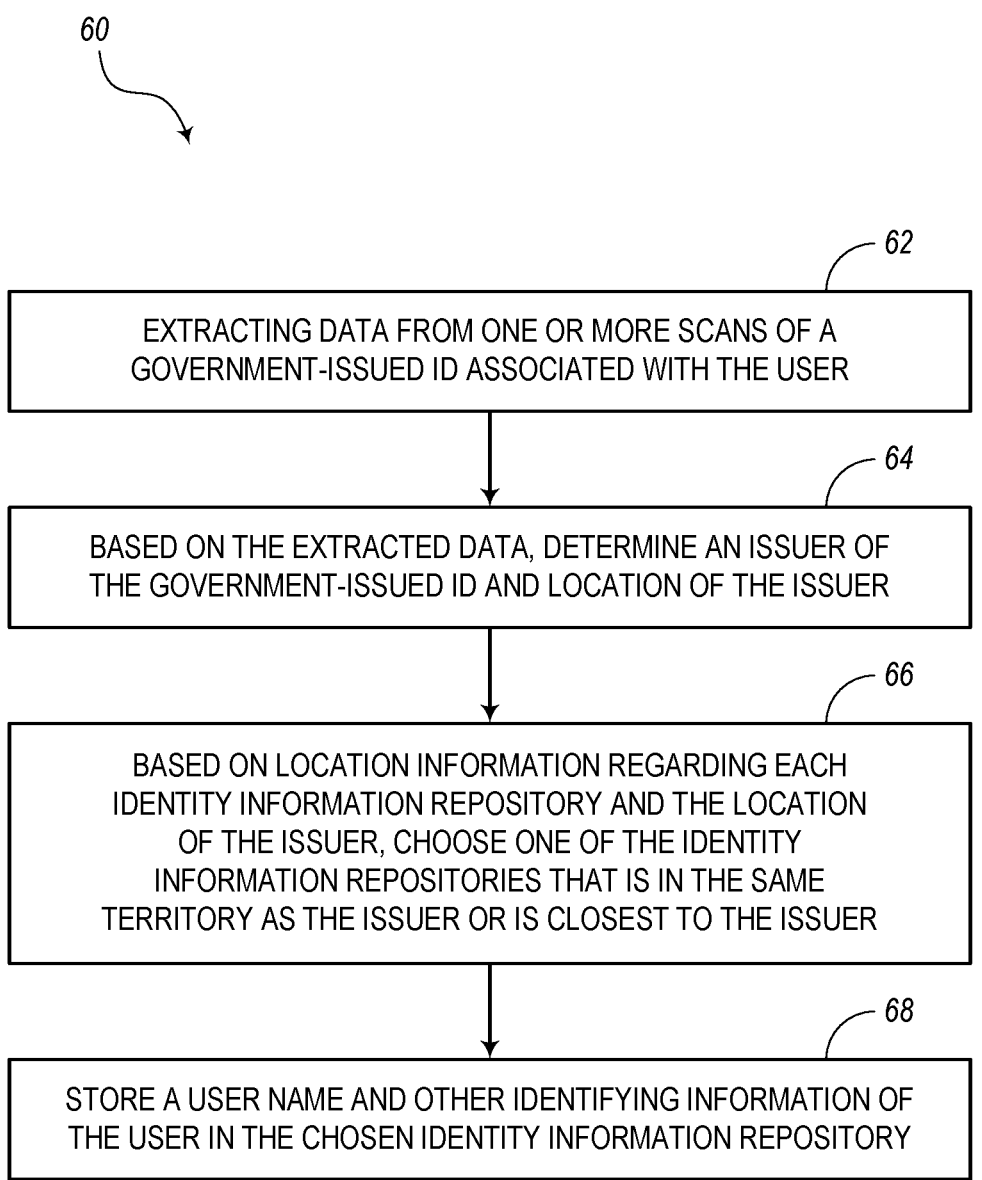

*60*

*62*

EXTRACTING DATA FROM ONE OR MORE SCANS OF A
GOVERNMENT-ISSUED ID ASSOCIATED WITH THE USER

*64*

BASED ON THE EXTRACTED DATA, DETERMINE AN ISSUER OF
THE GOVERNMENT-ISSUED ID AND LOCATION OF THE ISSUER

*66*

BASED ON LOCATION INFORMATION REGARDING EACH
IDENTITY INFORMATION REPOSITORY AND THE LOCATION
OF THE ISSUER, CHOOSE ONE OF THE IDENTITY
INFORMATION REPOSITORIES THAT IS IN THE SAME
TERRITORY AS THE ISSUER OR IS CLOSEST TO THE ISSUER

*68*

STORE A USER NAME AND OTHER IDENTIFYING INFORMATION OF
THE USER IN THE CHOSEN IDENTITY INFORMATION REPOSITORY

FIG. 4

REMOTE IDENTITY VERIFICATION AND DYNAMIC STORAGE OF IDENTITY DATA

TECHNICAL FIELD

The present disclosure generally relates to network security systems and methods. More particularly, the present disclosure relates to remotely verifying the identity of a user and selectively storing identity data within a distributed repository system.

BACKGROUND

In 2020, the European Telecommunications Standards Institute (ETSI) assembled a Specialist Task Force (STF) known as STF 588 to focus on identity proofing (both in real life and online). The STF reviewed a variety of international technologies, legislation, specifications, guidelines, and standards related to identity proofing and created Technical Specification (TS) known as ETSI TS 119 460 (Survey of technologies and regulatory requirements for identity proofing for trust service subjects). The STF analyzed close to 50 international standards and their respective approaches to the collection and validation of identity attributes, the binding of attributes to applicants, and the appropriate retention of evidence. A second influential work product resulted in ETSI TS 119 461 (Policy and security requirements for trust service components providing identity proofing of trust service subjects). Although designed for identity proofing for electronic Identification, Authentication, and trust Services (eIDAS), such as Trust Service Provider (TSP) issuers of qualified certificates, it is believed that the standard will have broad relevance in electronic identity (eID) technologies, Know Your Customer (KYC) technologies, Anti-Money Laundering (AML) technologies, and other security systems and processes in various industries worldwide.

BRIEF SUMMARY

The present disclosure is directed to systems and methods for remotely verifying the identity of a user. A method, according to one implementation, includes the step of receiving, from a representative of an enterprise, a selection of a group of users to be assigned one or more authorities within the enterprise. The method also includes the step of remotely accessing one or more identity information repositories associated with the enterprise to obtain records pertaining to each user of the group. Also, the method includes the step of using the records to onboard the group of users, whereby onboarding the group includes assigning the one or more authorities to each user of the group.

According to additional embodiments, the method may include the step of performing an identity verification process for each user. For example, the identity verification process may include the steps of a) receiving input from the respective user to verify the identity of the user, and b) when the identity of the user is verified, enabling the user to perform an action that falls within the one or more authorities assigned to the user. The step of receiving input from the user may include receiving one or more scans of a government-issued ID and one or more visual images of the user captured by a processing device. In some embodiments, the one or more visual images may include a video of the user when both the processing device or other type of device and the user's head are in motion. Also, the government-issued ID may be a driver's license, a passport, or a national identity card. The enterprise may include multiple identity information repositories located in different locations. The identity verification process, for example, may also include the steps of c) extracting data from the one or more scans of the government-issued ID, d) based on the extracted data, determining an issuer of the government-issued ID and a location of the issuer, e) searching location information regarding the multiple identity information repositories, f) based on the location information, choosing one of the multiple identity information repositories that is either in the same territory as the issuer or is closest to the issuer, and g) storing the name and other identifying information of the user in the chosen identity information repository. The step of performing the action may include electronically signing a document.

Furthermore, the step of obtaining the records may include the step of searching through the one or more identity information repositories to gather a name and other identifying information associated with each user. The name and identifying information, for example, may be used for performing a Remote Identity Verification (RIV) process to allow the user to perform an action that falls within the one or more authorities assigned to the user. Also, the selection of the group of the users may include the steps of a) allowing the representative to configure or choose a policy engine adapted to obtain the records pertaining to each user of the group; and b) scheduling the policy engine to automatically capture changes in the records.

According to some alternative embodiments, the systems and methods of the present disclosure may be expanded beyond the scope of identifying users (employees) of an enterprise. For example, some implementations may be applied to systems and methods where multiple "entity objects" are analyzed to determine if their identity can be verified. In this case, the entity objects may represent user objects, people, users, employees, user devices, computers, server, or security principals, where each entity object includes a security identifier and other identifying information. For example, the security identifier may include a name, a username, a nickname, a pseudonym, a login name, a screen name, a handle, etc. Also, each entity object can be identified and authenticated by a Trust Service Provider (TSP) before any enterprise rights or privileges are assigned thereto.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 3 is a flow diagram illustrating an embodiment of a method for remotely verifying the identity of a user.

FIG. 4 is a flow diagram illustrating an embodiment of a method for dynamically storing user identity information in any of a plurality of repositories of an enterprise.

DETAILED DESCRIPTION

Figure 1:
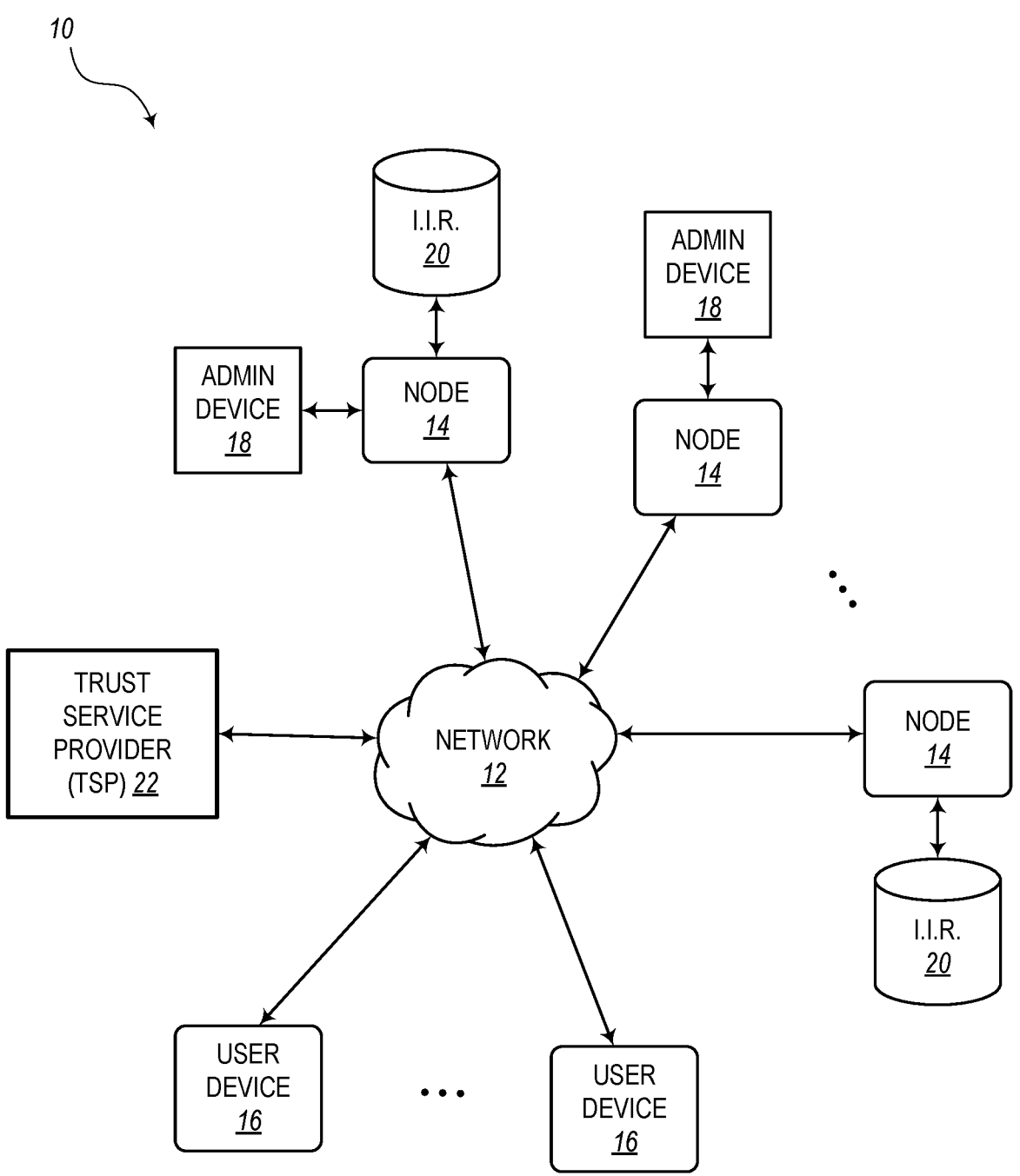
FIG. 1 is a diagram illustrating an embodiment of a communication system.

The present disclosure relates to systems and methods for automated remote identity verification of user information stored in one or more user databases or user stores. The present disclosure also relates to systems and methods for dynamically storing identity information in a selected database or repository of a plurality of repositories based on the location of an entity or government agency that issues an identification (ID) card to the corresponding user.

With the massive shift to remote work, which has been accelerated by the pandemic, the mindset of company administrators (e.g., Chief Information Officers (CIOs), Information Technology (IT) managers, admin, etc.) has shifted from an original paradigm in which employees work out of offices (or other defined areas) to a new paradigm in which employees can work anywhere in the world. Additionally, the shift from wet ink to electronic signatures (e-signatures) has also grown. Administrators often put certain policies in place to verify the identity of an employee who signs certain documents (or performs some other type of authoritative action). In the physical world, this may include having a supervisor checking that the signing employee is authorized to sign and/or may sign for this employee if they do not have the proper authority. In online environments, when an employee needs to electronically sign a document, a company may have other policies for electronic verification. Thus, there is a need for entities (e.g., enterprises, governments, universities, insurance companies, real estate companies, banks, financial services companies, healthcare systems, etc.) to incorporate an automated process to enable remote identity verification for all users (and user objects) associated with any and all user databases or user stores of the entity.

In a broader sense, a "user object" may be used to represent not only an employee, but may also represent any person, user, user device, computer, etc. In some embodiments, the user object may be a security principal having a security identifier (SID) that allows the principal to be referenced for identification or assignment of authorities or permissions. A user object in an Active Directory (AD) may have attributes or credentials that contain information such as name, user name, screen name, online name, etc. A "security principal" may be an entity that can be authenticated by a computer system or network. Principals can be individual people, computers, services, computational entities, or any group of such things. Before they can be assigned authorities, rights, privileges, etc. in an enterprise or network, the principal needs to be identified and authenticated. However, for the sake of simplicity, the term "user" is mentioned throughout the present disclosure to define any recognizable entity having some level of authority to perform an action.

According to a first implementation, the present disclosure is configured to provide systems and methods that automate the process of Remote Identity Verification (RIV) of any user databases, stores, listings, etc. For example, in an enterprise, the user database or user store may typically be implemented as a Lightweight Directory Access Protocol (LDAP) storage device, Active Directory (AD), or other suitable data storage or memory system. In this first implementation, the present disclosure provides a system in which an admin or IT professional can log into an RIV service system configured to assist the admin. The RIV service system can then access the user database (or databases) associated with the enterprise. For example, this access process may involve a discovery service.

Next, the admin is allowed to select any group of subsets of users (employees) for whom some authorities or privileges are to be given. For example, the admin can select users in one or more departments (e.g., legal department, financial department, Human Resources (HR) department, etc.), can select all users in the enterprise, or can select users based on other criteria. In some embodiments, the admin can create or choose a policy engine that may be configured to gather user data to capture changes (e.g., additions, deletions, edits, etc.) therein. The policy engine may be configured, for example, to run periodically, such as according to a predefined scheduler or routine. In particular, the gathering of user information, regardless of the means by which it is gathered, include receiving, obtaining, or requesting data this may be needed for verifying or authenticating the identity of the users.

Then, after identity verification (e.g., RIV), various systems in the enterprise may then be used to enable the verified user to perform one or more actions (e.g., e-signing) for which the user is permitted to perform on behalf of the enterprise. For example, the user information may include one or more various pieces of data, such as full legal user name, email address, organization, etc. The information needed for verification may further include other identifying information, such as passwords, answers to security questions (e.g., user's mother's maiden name, etc.), mailing address, user's biometric information (e.g., retinal scan, fingerprint, etc.).

According to a second implementation of the present disclosure, systems and methods are provided for dynamically routing user information to a specific repository of a plurality of repositories associated with an enterprise for storage therein. The process of storing the user information in the specific repository may be based on various criteria. For example, the user information may be stored in a repository based on an entity (e.g., government agency, etc.) responsible for issuing an ID to the user, where the ID may be a driver's license, a passport, a national identification card, a Social Security card, etc.

Since the inception of various General Data Protection Regulations (GDPRs) in the European Union, one question that has arisen is the concern of where user data should reside. In some cases, this may be a simple procedure of asking users where they live or work and then transferring the users' information to databases in (or near) those locations. In other embodiments, the placement of user data may be performed in an automated manner. Therefore, another benefit of the present disclosure involves replacing the manual steps of the conventional systems with procedures that can be performed automatically and/or in conjunction with other identity verification (or RIV) processes.

According to some embodiments, therefore, the present disclosure may be further configured to extract data from an ID and use this data to determine a location for storage of the sensitive data. The extraction step may be performed in conjunction with an identity verification procedure and/or may be performed independently of any verification procedure. For example, the Applicant of the present disclosure offers identity verification services that include capturing one or more images of the user's ID (e.g., passport, driver's license, etc.) and capturing one or more images of the user. The images of the ID can be automatically viewed and processed by the systems and methods of the present disclosure to extract an issuer of the ID. According to one example, suppose that an enterprise employs many people and has physical offices and/or repositories in multiple European countries. Furthermore, suppose that it is determined from the extracted data that a German government agency issued the user's ID. In this case, the systems and methods of the present disclosure may be configured to store the user data in one or more databases or repositories within Germany. Similarly, if there are no repositories in Germany (or multiple repositories), the systems and methods of the present disclosure may be configured to store the user information in a repository that is closest to an office or headquarters of the issuer of the ID.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a diagram illustrating an embodiment of a communications system 10 that is configured to enable computing devices to communicate with each other over a network 12 (e.g., the Internet). Although multiple enterprises, businesses, universities, etc. may be connected in the communications system 10, one entity or enterprise is represented in FIG. 1 for the sake of simplicity. As shown, the enterprise may include a plurality of nodes 14 distributed in different locations throughout the communications system 10. The nodes 14 may include servers or other computing devices for providing various services to a plurality of user devices 16 via the network 12. For example, each user device 16 may be associated with one or more employees of the enterprise.

One or more of the nodes 14 of the enterprise may be connected to an admin device 18 for performing management and administration functions on behalf of the enterprise. Also, one or more of the nodes 14 of the enterprise may also be connected to an identity information repository 20. Each identity information repository 20 may be configured as a database, data store, user store, identification (ID) store, credential store, Lightweight Directory Access Protocol (LDAP) store, Active Directory (AD), data silo, or one or more other suitable data storage components for storing data. For example, each identity information repository 20 may be configured to store and retain user (employee) information, user objects, account information, passwords, etc., which may be used in one or more processes of identifying employees of the enterprise, online identity vetting, identity proofing, etc.

In addition to the components of the enterprise, the communications system 10 further includes a Trust Service Provider (TSP) 22. For example, the TSP 22 may be a Remote Identity Verification (RIV) system, a Public Key Infrastructure (PKI) management system, a Certificate Authority (CA) system, an administrative services device, etc. The TSP 22 may be a computing system or server configured as a third-party device for performing one or more trust or security functions for the enterprise and/or other enterprises, businesses, subnetworks, etc. The TSP 22 may be configured as a cloud-based system.

In some embodiments, the TSP 22 may be configured to verify the identity of a user (employee) when that user is attempting to perform some type of action that may require security, encryption, etc. For example, to allow a user to perform an electronic signing action, the TSP 22 may be configured to verify the user's identity beforehand. Certain users may be authorized to perform a restricted number of actions on behalf of the enterprise. The TSP 22 can check that each user has been proper authority to perform certain actions and prevent unauthorized activity.

Figure 2:
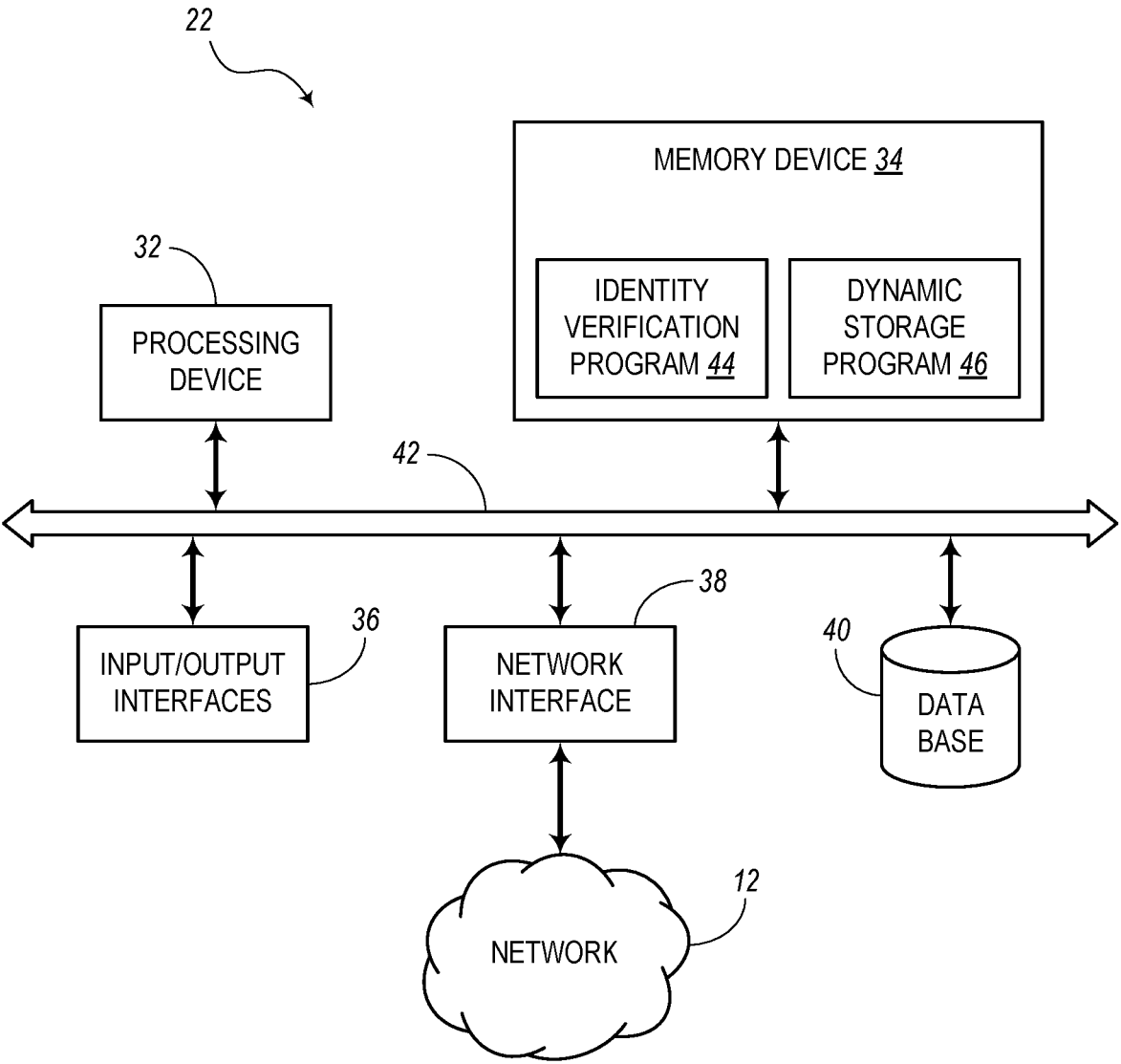
FIG. 2 is a block diagram illustrating an embodiment of a Trust Service Provider (TSP) operating in the communication system of FIG. 1.

FIG. 2 is a block diagram illustrating an embodiment of the TSP 22 operating in the communication system 10 of FIG. 1. In the illustrated embodiment, the TSP 22 may be a digital computing device that generally includes a processing device 32, a memory device 34, Input/Output (I/O) interfaces 36, a network interface 38, and a database 40. It should be appreciated that FIG. 2 depicts the TSP 22 in a simplified manner, where some embodiments may include additional components and suitably configured processing logic to support known or conventional operating features. The components (i.e., 32, 34, 36, 38, 40) may be communicatively coupled via a local interface 42. The local interface 42 may include, for example, one or more buses or other wired or wireless connections. The local interface 42 may also include controllers, buffers, caches, drivers, repeaters, receivers, among other elements, to enable communication. Further, the local interface 42 may include address, control, and/or data connections to enable appropriate communications among the components 32, 34, 36, 38, 40.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, enable or cause the one or more processors to perform a set of operations, steps, methods, processes, algorithms, functions, techniques, etc. as described herein for the various embodiments.

The TSP 22 may include an identity verification program 44 and a dynamic storage program 46. The identity verification program 44 may be include RIV software or applications for verifying the identity of users (employees) attempting to perform some type of action that requires some level of authority, security, clearance, etc. If the user is identified as having the proper authority, the identify verification program 44 may be configured to allow the user device 16 associated with the requesting user to proceed with the action. Further details of the identity verification program 44 are described below, particularly with respect to FIG. 3.

Also, the dynamic storage program 46 may be configured as a separate software application from the identity verification program 44 or may work in conjunction with the identity verification program 44. The dynamic storage program 46 may be configured to receive user input, which may be the result of the user attempting to perform some action that requires identity verification or may be independent of other services. The user input, for example, may include one or more images of the user's ID, such as a driver's license, a passport, a national identification card, etc. The dynamic storage program 46 may be configured to automatically detect an issuer of the user's ID (e.g., German government-issued ID). When the issuer is identified, the dynamic storage program 46 is configured to determine the location of each of the identity information repositories 20 in the communications system 10. Then, the dynamic storage program 46 is configured to determine the identity information repository 20 that is within the same territory (e.g., country, state, county, city, jurisdiction, locality, etc.) as the issuer or the identity information repository 20 that is closest to the issuer. Then, the dynamic storage program 46 is configured to send the user input to the appropriate identity information repository 20 for storage therein.

FIG. 3 is a flow diagram illustrating an embodiment of a method 50 for remotely verifying the identity of a user. In some embodiments, as suggested above, the method 50 may be associated with the identity verification program 44 of the TSP 22. As illustrated, the method 50 includes the step of receiving, from a representative of an enterprise, a selection of a group of users to be assigned one or more authorities within the enterprise, as indicated in block 52. The method 50 also includes remotely accessing one or more identity information repositories associated with the enterprise to obtain records pertaining to each user of the group, as indicated in block 54. Also, the method 50 includes the step of using the records to onboard the group of users, as indicated in block 56, whereby onboarding the group includes assigning the one or more authorities to each user of the group.

According to additional embodiments, the method 50 may include the step of performing an identity verification process for each user. For example, the identity verification process may include the steps of a) receiving input from the respective user to verify the identity of the user, and b) when the identity of the user is verified, enabling the user to perform an action that falls within the one or more authorities assigned to the user. The step of receiving input from the user may include receiving one or more scans of a government-issued ID and one or more visual images of the user captured by a mobile device, laptop, or any processing device. In some embodiments, the one or more visual images may include a video of the user when both the processing device and the user's head are in motion. Also, the government-issued ID may be a driver's license, a passport, or a national identity card. The enterprise may include multiple identity information repositories 20 located in different locations. The identity verification process, for example, may also include the steps of c) extracting data from the one or more scans of the government-issued ID, d) based on the extracted data, determining an issuer of the government-issued ID and a location of the issuer, e) searching location information regarding the multiple identity information repositories, f) based on the location information, choosing one of the multiple identity information repositories that is either in the same territory as the issuer or is closest to the issuer, and g) storing the name and other identifying information of the user in the chosen identity information repository. The step of performing the action may include electronically signing a document.

Furthermore, the step of obtaining the records (block 54) may include the step of searching through the one or more identity information repositories 20 to gather a name and other identifying information associated with each user. The name and identifying information, for example, may be used for performing a Remote Identity Verification (RIV) process to allow the user to perform an action that falls within the one or more authorities assigned to the user. Also, the selection of the group of the users (block 52) may include the steps of a) allowing the representative to configure or choose a policy engine adapted to obtain the records pertaining to each user of the group; and b) scheduling the policy engine to automatically capture changes in the records.

According to some alternative embodiments, the systems and methods of the present disclosure may be expanded beyond the scope of identifying users (employees) of an enterprise. For example, some implementations may be applied to systems and methods where multiple "entity objects" are analyzed to determine if their identity can be verified. In this case, the entity objects may represent user objects, people, users, employees, user devices, computers, server, or security principals, where each entity object includes a security identifier and other identifying information. For example, the security identifier may include a name, a username, a nickname, a pseudonym, a login name, a screen name, a handle, etc. Also, each entity object can be identified and authenticated by the TSP 22 before any enterprise rights or privileges are assigned thereto.

FIG. 4 is a flow diagram illustrating an embodiment of a method 60 for dynamically storing user identity information in any of a plurality of repositories of an enterprise. In some embodiments, as suggested above, the method 60 may be associated with the dynamic storage program 46 of the TSP 22 or other system configured to perform Remote Identity Verification (RIV) services for an enterprise having multiple identity information repositories 20 located in multiple locations.

For each user of the enterprise, the method 60 may include the step of extracting data from one or more scans of a government-issued ID associated with the user, as indicated in block 62. Based on the extracted data, the method 60 may also include the step of determining an issuer of the government-issued ID and a location of the issuer, as indicated in block 64. Based on location information regarding each identity information repository and the location of the issuer, the method 60 may also include the step of choosing one of the identity information repositories that is in the same territory as the issuer or is closest to the issuer, as indicated in block 66. Also, the method 60 may include storing a user name and other identifying information of the user in the chosen identity information repository, as indicated in block 68.

According to additional implementations, the method 60 may include the steps of a) receiving, from a representative of the enterprise, a selection of a group of users to be assigned one or more authorities within the enterprise, b) remotely accessing the multiple identity information repositories to obtain records pertaining to each user of the group, and c) using the records to onboard the group of users, whereby onboarding the group includes assigning the one or more authorities to each user of the group.

It may be noted that the embodiments described herein may include other similar technologies and processes for offering security and trust assistance for one or more entities (e.g., enterprises, banks, law firms, government agencies, etc.) that have needs for giving authorities or privileges to certain groups of users. The security servers or services described in the present disclosure may be configured as Trust Service Providers (TSPs), Certificate Authority (CA) units, PKI-based systems, and/or other similar systems for operating according to Secure Sockets Layer (SSL) and/or Transport Layer Security (TLS) protocols.

In addition to the services mentioned throughout the present disclosure, data communication and infrastructures associated with the embodiments of the present disclosure may involve the use of cloud-based servers for assisting entities with safe and secure transmission of sensitive data. In some embodiments, the transmission of user data may include container-based software and firmware to enable distributed functions throughout the communications system 10.

The trust and security offered by the embodiments of the present disclosure are sufficient to validate digital signatures that are legally binding. Also, the services can ensure that the signers are correctly identified and that the signed document has not been modified. The solutions enable companies to meet regulatory demands for high levels of signature assurance. The TSPs may be ideal for industries that require numerous legally binding digital signatures, such as insurance, real estate, financial, healthcare and education, as well as businesses that are supporting remote workers or that want to offer remote onboarding in their digital applications to improve and accelerate customer engagement.

The systems and methods enable remote identity verification, helping organizations to meet global standards for assurance without requiring in-person validation. Also, they enable signing as individuals (e-signatures) or as an organization (e-seals) to strengthen compliance with corporate policies such as Know Your Customer (KYC) policies, Anti-Money Laundering (AML) policies, and/or other policies and requirements. Also, the systems and methods are configured to meets regulatory standards (e.g., eIDAS, Swiss ZertES, etc.) in Europe and throughout the world. Also, they are configured to meet technical requirements of the Adobe Approved Trust List (AATL), as well as corporate or local government policies. Furthermore, the systems and methods can support audit trail requirements for compliance with government and industry regulations, including HIPAA and financial services requirements. They can also provide Long Term Validation (LTV) to demonstrate that a document is still valid and has not been tampered with, even if it is opened in the future.

In some cases, RIV may be associated with remote identity verification (or validation), identity proofing, identity vetting, etc. RIV may involve authenticating the identity of a person through government identification, biometrics, facial recognition, or other means. It can be used to access healthcare data, onboarding with insurance or banking organizations, remote hiring, online education, online identity vetting, among other use cases. RIV may also include Remote identity proofing (RIDP), which is another secure way to authenticate identity and digitally onboard a signer or a customer.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A Trust Service Provider (TSP) comprising:
a processing device; and
a memory device configured to store a computer program having logic that enables the processing device to execute the steps of
receiving, from a representative of an enterprise, a selection of a group of users to be assigned one or more authorities within the enterprise,
remotely accessing one or more identity information repositories associated with the enterprise to obtain records pertaining to each user of the group, wherein the records are obtained by searching through the one or more identity information repositories to gather a name and other identifying information associated with each user, whereby the name and identifying information are used for performing a Remote Identity Verification (RIV) process to allow the user to perform an action that falls within the one or more authorities assigned to the user, and
using the records to onboard the group of users, whereby onboarding the group includes assigning the one or more authorities to each user of the group, and wherein the selection of the group of users includes configuring a policy engine by the representative, the policy engine being adapted to obtain the records pertaining to each user of the group and to automatically capture changes in the records over time,
wherein the enterprise includes multiple identity information repositories located in different locations, and wherein onboarding each user further includes:
extracting data from a government-issued ID provided by the user;
determining, based on the extracted data, an issuer of the government-issued ID and a location of the issuer;
searching location information regarding the multiple identity information repositories;

selecting one of the multiple identity information repositories that is either in a same territory as the issuer or is closest to the issuer; and storing the name and other identifying information of the user in the selected identity information repository.

2. The TSP of claim 1, wherein the logic further enables the processing device to perform an identity verification process, wherein, for each user, the identity verification process includes the steps of:

a) receiving input from the respective user to verify the identity of the user, and b) when the identity of the user is verified, enabling the user to perform an action that falls within the one or more authorities assigned to the user.

3. The TSP of claim 2, wherein receiving input from the user includes receiving one or more scans of the government-issued ID and one or more visual images of the user captured by a processing device.

4. The TSP of claim 3, wherein the one or more visual images include a video of the user when both the processing device and the user's head are in motion.

5. The TSP of claim 3, wherein the government-issued ID is a driver's license, a passport, or a national identity card.

6. The TSP of claim 2, wherein performing the action includes electronically signing a document.

7. The TSP of claim 1, wherein the selection of the group of the users includes:

a) allowing the representative to configure or choose a policy engine adapted to obtain the records pertaining to each user of the group; and b) scheduling the policy engine to automatically capture changes in the records.

8. A non-transitory computer-readable medium configured to store computer logic having instructions that, when executed, enable a processing device to:

receive, from a representative of an enterprise, a selection of a group of users to be assigned one or more authorities within the enterprise, remotely access one or more identity information repositories associated with the enterprise to obtain records pertaining to each user of the group, wherein the records are obtained by searching through the one or more identity information repositories to gather a name and other identifying information associated with each user, whereby the name and identifying information are used for performing a Remote Identity Verification (RIV) process to allow the user to perform an action that falls within the one or more authorities assigned to the user, and use the records to onboard the group of users, whereby onboarding the group includes assigning the one or more authorities to each user of the group, and wherein the selection of the group of users includes configuring a policy engine by the representative, the policy engine being adapted to obtain the records pertaining to each user of the group and to automatically capture changes in the records over time, wherein the enterprise includes multiple identity information repositories located in different locations, and wherein onboarding each user further includes:

extracting data from a government-issued ID provided by the user;

determining, based on the extracted data, an issuer of the government-issued ID and a location of the issuer;

searching location information regarding the multiple identity information repositories;

selecting one of the multiple identity information repositories that is either in a same territory as the issuer or is closest to the issuer; and storing the name and other identifying information of the user in the selected identity information repository.

9. The non-transitory computer-readable medium of claim 8, wherein the instructions further enable the processing device to perform an identity verification process, wherein, for each user, the identity verification process includes the steps of:

a) receiving input from the respective user to verify the identity of the user, and b) when the identity of the user is verified, enabling the user to perform an action that falls within the one or more authorities assigned to the user.

10. The non-transitory computer-readable medium of claim 9, wherein receiving input from the user includes receiving one or more scans of government-issued ID and one or more visual images of the user captured by a processing device.

11. The non-transitory computer-readable medium of claim 10, wherein the one or more visual images include a video of the user when both the processing device and the user's head are in motion.

12. The non-transitory computer-readable medium of claim 10, wherein the government-issued ID is a driver's license, a passport, or a national identity card.

13. The non-transitory computer-readable medium of claim 9, wherein performing the action includes electronically signing a document.

14. The non-transitory computer-readable medium of claim 8, wherein the selection of the group of the users includes:

a) allowing the representative to configure or choose a policy engine adapted to obtain the records pertaining to each user of the group; and b) schedule the policy engine to automatically capture changes in the records.

15. A method comprising steps of:

receiving, from a representative of an enterprise, a selection of a group of users to be assigned one or more authorities within the enterprise, remotely accessing one or more identity information repositories associated with the enterprise to obtain records pertaining to each user of the group, wherein the records are obtained by searching through the one or more identity information repositories to gather a name and other identifying information associated with each user, whereby the name and identifying information are used for performing a Remote Identity Verification (RIV) process to allow the user to perform an action that falls within the one or more authorities assigned to the user, and using the records to onboard the group of users, whereby onboarding the group includes assigning the one or more authorities to each user of the group, and wherein the selection of the group of users includes configuring a policy engine by the representative, the policy engine being adapted to obtain the records pertaining to each user of the group and to automatically capture changes in the records over time, wherein the enterprise includes multiple identity information repositories located in different locations, and wherein onboarding each user further includes:

extracting data from a government-issued ID provided by the user;

determining, based on the extracted data, an issuer of the government-issued ID and a location of the issuer;

searching location information regarding the multiple identity information repositories;

selecting one of the multiple identity information repositories that is either in a same territory as the issuer or is closest to the issuer; and storing the name and other identifying information of the user in the selected identity information repository.

16. The method of claim 15, further comprising performing an identity verification process, wherein, for each user, the identity verification process includes the steps of:

a) receiving input from the respective user to verify the identity of the user, and b) when the identity of the user is verified, enabling the user to perform an action that falls within the one or more authorities assigned to the user.

17. The method of claim 16, wherein receiving input from the user includes receiving one or more scans of government-issued ID and one or more visual images of the user captured by a processing device.

18. The method of claim 15, wherein the selection of the group of the users includes:

a) allowing the representative to configure or choose a policy engine adapted to obtain the records pertaining to each user of the group; and b) scheduling the policy engine to automatically capture changes in the records.

* * * * *